No Printed Specification Available
S. H. Long.
Truss Bridge.
No 5862X
Patented Mar. 6, 1830.
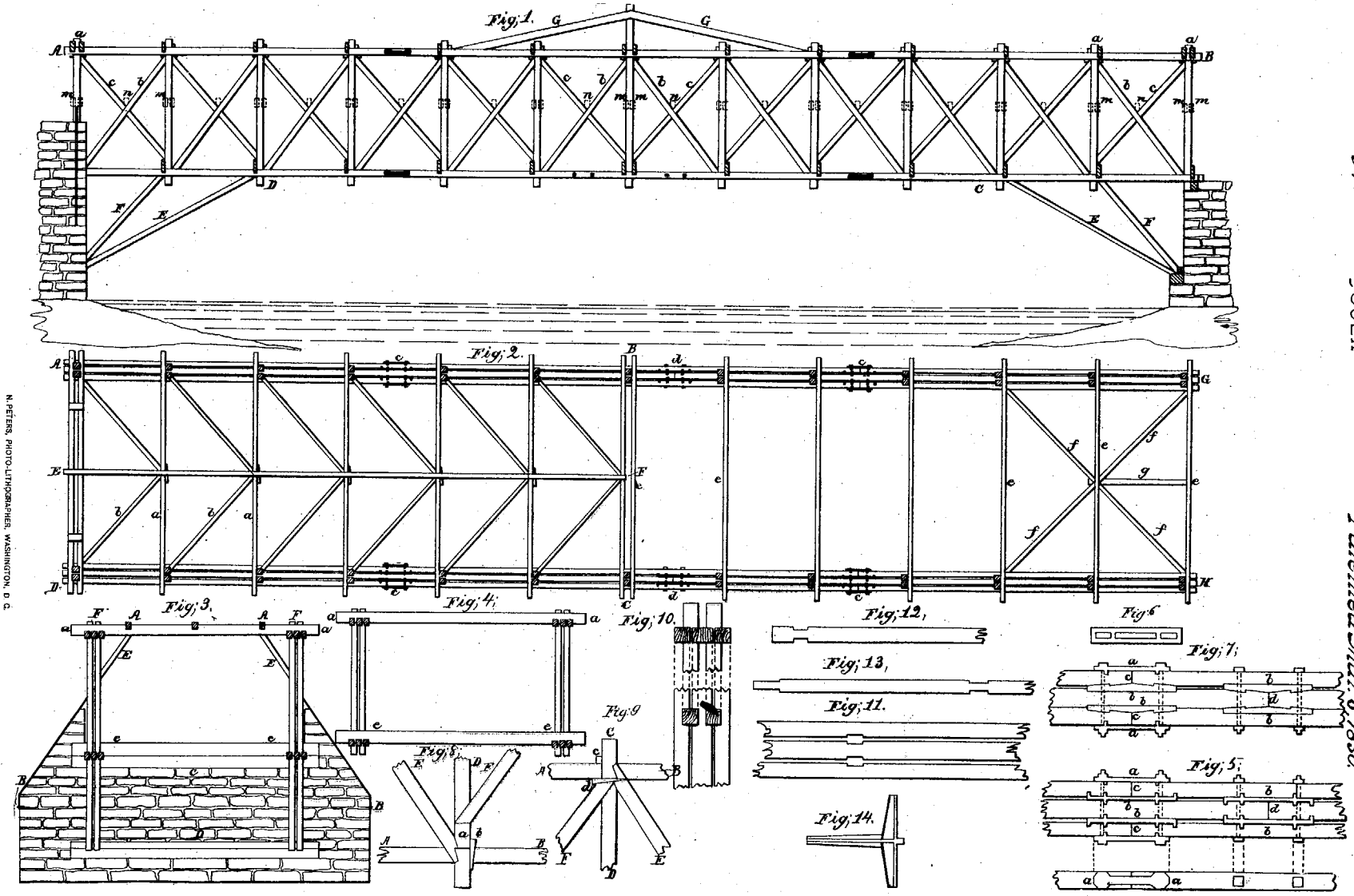
N. PETERS, PHOTO-LITHOGRAPHER, WASHINGTON, D. C.

Mar 6 1830 5.

S. H. Long March 6, 1830
Letters Patent X5862

The Schedule referred to in these Letters Patent and making part of the same containing a description in the words of the said S. H. Long himself of his improvement in the construction of wooden or frame Bridges.

The objects aimed at in this invention are greater simplicity & economy in the construction of Bridges together with greater strength & efficiency than has hitherto been attained from any combination of principles or arrangement of parts heretofore adopted in structures of this description.
The improvements under consideration by means of which the objects above mentioned are to be accomplished consist in the following modifications or arrangements in the construction of the main longitudinal truss frames necessary to the formation and support of a bridge. Viz. 1st Two modes of splicing the string pieces one of which is effected by means of wooden & the other by means of iron splicing pieces, of a construction different from any heretofore adopted in bridge architecture.
2nd A system of bracing by means of which the truss frames are exempted from leverage in any part liable to be affected by such an action. & the shocks or thrusts communicated by the braces are resisted by shoulders or steps as nearly as may be at right angles with the grain or fibres of the timber. 3. A system of counter bracing by means of which the truss frames are rendered stiff & unyielding & the bridge kept in uniform action whether loaded or unloaded. 4th A mode of furnishing the main braces and posts with metallic bearings by the introduction of thin plates of iron, copper or other suitable metal between the heel & toe of each main brace & the steps in the posts

X5862 against which they thrust &c 5th A mode of keying or wedg-
ing by means of which the central parts of the truss frames &
consequently of the bridge may be elevated and sustained
in case of a subsidence or sinking of those parts, which is
liable to happen from a shrinkage and extraordinary
compression of the timber. These several improvements which
are claimed as new, useful and original together with
a variety of other arrangements many of which are be-
lieved to be unprecedented in bridge architecture
will be more clearly illustrated by the drawings and ex-
planatory references hereto annexed & exhibited under
the designation of the Vuckson Bridge ——

Explanations & References to the Drawings.

Plate I Fig 1 A side view of the truss Frame exhibiting
the systems of bracing adverted to in articles 2 & 3 of the pre-
ceding ~~specification~~ specification. A.B. the upper string
showing the position of its splices, & the insertions of the posts
&c C.D. The lower string with its splices &c. Note in asmuch
as the upper string acts by thrust & the lower by tension, the splices
of the latter only require particular care & precision in their ad-
justment E.F. Inferior Arch braces supported on the lower
sill of the abutments & inserted in the lower string immediate-
ly behind the 2d & 3d posts from each extremity of the truss
frame. G. Superior arch braces connected with the centre
post, prolonged above the Frame & inserted in the upper string
at the head of the 2d post from the centre a, the Posts b. the
main braces c. the counter braces. Note, This figure is
also intended to indicate the manner of constructing the Excellen[illegible]
via-duct, which differs only from the bridge in its adaptation to the purposes
of a rail road, in which application the floor timbers must
be more frequent in order to afford an unyielding support to
the rails, & the arrangements in other respects must be such
so

X5862

[illegible] to admit the free & safe passage of a Locomotive Steam Engine.
m. The positions of clamp beams or floor timbers, attached to the
posts by means of screw bolts. n. The positions of intermediate floor
timbers resting upon the main & counter braces, at their junction
or intersection. Note The relative distances between the
upper & lower strings & any two adjacent posts longitudinally
of the Truss Frames should be about in the proportion of 1½ to 1.
Plate I Fig. 2. A horizontal view of a bridge with single road
way & double Truss-Frames. Note The right half of this figure
[illegible] B.C. G.H. presents a ~~[illegible]~~ view of the lower strings, floor tim
bers &c. & the left [illegible] A. B. C.D. a view of the upper strings
Beams lateral Braces &c. E.F. a Streamer mid way of the
Bridge affording the means of connecting the lateral braces with
the beams. a. the Beams. b. the lateral braces c. the spli
ces of the upper (and lower strings. d. the splices of the interior
string piece of the lower strings e. the floor timbers f. lateral
braces connected with the floor timbers g. a [illegible] Streamer
affording the means of connecting the braces e. with the floor
timbers. Plate I Fig. 3. An end view of the timbers &c of the Bridge
A B Stay braces of iron for maintaining the vertical position of the
Truss Frames. C. the upper & D the lower sill of the abutment E.
the transverse Braces. F the posts. a. the beams & c the floor timbers
Fig. 4. a. E &c the same as in Fig. 3. Fig. 5 Representing a portion
of the lower string with its iron splicing pieces &c a. the outside
or exterior splicing pieces, b. the interior splicing pieces - c. the spli
ced ends of the exterior string Pieces d. the spliced end of the
interior String Pieces. Fig. 6. a side view of one of the
interior. Splicing pieces showing the position of its transverse
lugs Fig. 7 Representing a portion of the lower string with in
terior splicing pieces of wood a. the same as in Fig 5. b. the
interior splicing piece which may be furnished with two coun
ter shoulders as in the figure, with four or with six shoulders
according to the [illegible] to be [illegible] upon it c. & d. the same as
in

X5862 in Fig 5. Note The string pieces are confined together by means of screw bolts, passing entirely thro' the string at the splices, & such other places as may be deemed necessary— The beams and floor timbers may also serve as clamps to the strings. Fig. 8 Showing the manner in which the Posts the Main & counter braces & the lower string are connected— A.B. a portion of the lower string. C.D. a Do. of the posts E. a Do. of the main Brace. F a Do. of the counter brace. a. a block supporting the lower extremity of the counter brace— b. c. the key by which the post is kept in close contact with the main Brace, & by which the Truss frame may be adjusted to its appropriate vertical direction. Note The toe of the Main Brace thrusts against the lower shoulder or step of the Post & the heel against another shoulder behind the block a. represented in the figure by faintly dotted lines. Fig. 9. showing the manner in which the posts the main & counter braces and the upper strings are connected. A.B. a portion of the upper string. C.D. a Do. of the Post E a Do. of the Main Brace. F a Do. of the counter brace. c. the key at the head of the Post same as b.c. of Fig. 8. d. a key passing between the head of the counter Brace & the centre string piece, & serving to communicate a thrust or action to the counter Brace. Fig. 10. End view of the Posts and string pieces projected into each other— Fig. 11. A view of a portion of one of the strings showing the notches for the reception of the Posts. Fig. 12. A view of a portion of the Post showing its neck or the notches for the reception of the string pieces Fig. 13. A view of a portion of the counter brace, showing the tongue and shoulders of one end & the notches for the reception of the Main Braces. Fig 14 A view of the anchor placed in the abutment at B. Fig. 3 to which the iron stay is attached—

Witnesses
Fielder Israel
Joseph S. Ogden

S. H. Long Topl. Engr.
Bt. Lt. Col.

[illegible]

Drawing made [illegible] 14762